US009304056B2

(12) United States Patent
Albaladejo et al.

(10) Patent No.: US 9,304,056 B2
(45) Date of Patent: Apr. 5, 2016

(54) LEAK DETECTION DEVICE, AND COATING INTENDED FOR A FLUID TRANSPORT OR STORAGE MEMBER AND COMPRISING SAID DETECTION DEVICE

(75) Inventors: Serge Albaladejo, Trets (FR); Rémi Zanolin, Marseilles (FR)

(73) Assignee: Commisariat a L'Energie Atomique et aux Energies Alternatives, Paris (FR)

( * ) Notice: Subject to any disclaimer, the term of this patent is extended or adjusted under 35 U.S.C. 154(b) by 150 days.

(21) Appl. No.: 13/819,061

(22) PCT Filed: Sep. 5, 2011

(86) PCT No.: PCT/FR2011/000488
§ 371 (c)(1),
(2), (4) Date: Feb. 26, 2013

(87) PCT Pub. No.: WO2012/032233
PCT Pub. Date: Mar. 15, 2012

(65) Prior Publication Data
US 2013/0154666 A1 Jun. 20, 2013

(30) Foreign Application Priority Data

Sep. 8, 2010 (FR) ...................................... 10 03573

(51) Int. Cl.
*G01M 3/30* (2006.01)
*G01M 3/40* (2006.01)
(Continued)

(52) U.S. Cl.
CPC ................ *G01M 3/40* (2013.01); *G01M 3/165* (2013.01); *G01M 3/18* (2013.01); *Y10T 29/49947* (2015.01)

(58) Field of Classification Search
CPC ..... G01M 3/18; G01M 3/2807; G01M 3/243; G01M 3/283; G01M 3/40; G01M 3/045
USPC ....................................................... 73/40–49.8
See application file for complete search history.

(56) References Cited

U.S. PATENT DOCUMENTS 3,607,515 A * 9/1971 Pennie .......................... 156/187
3,721,970 A 3/1973 Niemoth
4,332,170 A * 6/1982 Belval et al. ................ 73/40.5 R
(Continued)

FOREIGN PATENT DOCUMENTS

EP 0 093 025 A1 11/1983
EP 454103 A1 * 10/1991 .............. B29C 67/00
(Continued)

OTHER PUBLICATIONS

English translation of a Notification for Reasons for Rejection dated Aug. 19, 2014 for Application No. JP 2013-527655.
(Continued)

*Primary Examiner* — David A Rogers
(74) *Attorney, Agent, or Firm* — Ladas & Parry LLP

(57) ABSTRACT

The invention relates in particular to a method of covering a duct for transporting or storing a fluid in a device for detecting a leak of the fluid, the device comprising a layer of insulating fibrous material arranged to surround the duct and a layer of conductive material that extends against the layer of insulating material, the conductive material being essentially constituted by fibers of carbon or graphite, wherein the layer of insulating material is secured to the wall of the duct by strapping ties around said layer.

20 Claims, 5 Drawing Sheets

(51) Int. Cl.
*G01M 3/16* (2006.01)
*G01M 3/18* (2006.01)

(56) References Cited

U.S. PATENT DOCUMENTS

| | | | | |
|---|---|---|---|---|
| 4,865,925 | A | * | 9/1989 | Ludwig et al. ............... 429/480 |
| 4,865,930 | A | * | 9/1989 | Kindler et al. ............... 429/314 |
| 4,926,165 | A | | 5/1990 | Lahlouh et al. |
| 5,145,732 | A | * | 9/1992 | Kyutoku ................ D01F 9/145 428/218 |
| 5,203,202 | A | * | 4/1993 | Spencer ..................... 73/40.5 R |
| 5,551,484 | A | * | 9/1996 | Charboneau .................. 138/104 |
| 5,698,012 | A | * | 12/1997 | Yoshikawa ........................ 96/47 |
| 5,905,194 | A | * | 5/1999 | Strong ....................... 73/40.5 R |
| 6,498,496 | B1 | | 12/2002 | Keller et al. |
| 6,814,105 | B1 | * | 11/2004 | Crim, Jr. ....................... 138/149 |
| 7,960,978 | B2 | * | 6/2011 | Keyes ........................... 324/694 |
| 2003/0011363 | A1 | * | 1/2003 | Wayman et al. .............. 324/238 |
| 2003/0094033 | A1 | * | 5/2003 | Gibbs ................................ 73/40 |
| 2005/0155663 | A1 | * | 7/2005 | Dhellemmes et al. ........ 138/149 |
| 2008/0053198 | A1 | * | 3/2008 | Issel et al. ................. 73/40.5 R |
| 2009/0223284 | A1 | * | 9/2009 | Buhring ..................... 73/40.5 A |
| 2010/0300184 | A1 | * | 12/2010 | Wayman et al. ................. 73/73 |
| 2011/0290411 | A1 | * | 12/2011 | Venero et al. .................. 156/195 |

FOREIGN PATENT DOCUMENTS

| | | |
|---|---|---|
| EP | 1 128 113 A1 | 8/2001 |
| FR | 2 155 534 A5 | 5/1973 |
| GB | 1311472 | 3/1973 |
| JP | 48-50790 A | 7/1973 |
| JP | 51-93274 A | 8/1976 |
| JP | 57-88050 | 5/1982 |
| JP | 61-75600 U | 5/1986 |
| JP | 2-216426 A | 8/1990 |
| JP | 3-51954 B2 | 8/1991 |
| JP | 4-308097 A | 10/1992 |
| JP | 6 101399 A | 4/1994 |
| JP | 10-9905 A | 1/1998 |
| JP | 2831688 B2 | 9/1998 |
| JP | 2001-235389 A | 8/2001 |
| JP | 2002-519658 A | 7/2002 |
| JP | 2007-23440 A | 2/2007 |
| RU | 2 030 044 C1 | 2/1995 |
| WO | 93/24819 A1 | 12/1993 |
| WO | 00/00801 A1 | 1/2000 |
| WO | 2007/087720 A1 | 8/2007 |

OTHER PUBLICATIONS

English translation of JP 3-51954 B2.
Patent Abstracts of Japan English abstract of JP 4-308097 A.
English translation of JP 51-93274 A.
English translation of JP 4-308097 A.
English translation of JP 61-75600 U.
Patent Abstracts of Japan English abstract of JP 2001-235389 A.
International Preliminary Report on Patentability for Application No. PCT/FR2011/000488.
English translation of an Office Action dated Oct. 13, 2014 for Russian Application No. 2013115293.
English translation of an Office Action dated Jan. 27, 2015 for Korean Application No. 10-2013-7008824.
English language translation of the abstract for JP 10-9905 A, dated Jan. 1999, as obtained from Espacenet.com.
Office Action dated Apr. 14, 2015 for Japanese Application No. 2013-527655.
Office Action dated Mar. 24, 2015 for Russian Application No. 2013115293.
J-PlatPat English abstract of JP 2007-23440 A.
espacenet English abstract of JPH02259543 A which is equivalent to JP 2831688 B2.
Butyrin, G.M., "High-Porosity Carbon Materials", Moscow Izdatel'Stvo Khimiya, 58237, 1976.
Matrenin, S.V., et al., "Polymer-based composite materials and coatings", Tomsk Polytechnical University, 2008.
Koritskiy, Y.V., et al., "Hand book of Electrical Engineering Materials", vol. 1, Moscow Energoatomizdat 1986.
"Thermal Insulation of Equipment and Pipelines", Snip 2. 04. 14-88.

* cited by examiner

LEAK DETECTION DEVICE, AND COATING INTENDED FOR A FLUID TRANSPORT OR STORAGE MEMBER AND COMPRISING SAID DETECTION DEVICE

RELATED APPLICATION INFORMATION

This application is a 371 of International Application PCT/FR2011/000488 filed 5 Sep. 2011 entitled "Leak Detection Device, And Coating Intended For A Fluid Transport Or Storage Member And Comprising Said Detection Device", which was published on 15 Mar. 2012, with International Publication Number WO 2012/032233 A1, and which claims priority from French Patent Application 1003573, filed 8 Sep. 2010, the content of which is incorporated herein by reference.

TECHNICAL FIELD

The present invention relates to a device for detecting leaks and to a covering for a member for transporting or storing fluid, the covering including the detector device.

The invention also relates to a member for transporting or storing fluid and fitted with such a covering, to a method of covering a member for transporting or storing fluid, and to a method of checking that such a leak detector device is operating properly.

The invention applies in particular to covering ducts for transporting liquid sodium and to containers for storing sodium and forming part of a cooling circuit of a nuclear reactor.

Below in the present application, and unless indicated explicitly or implicitly to the contrary, the term "duct" is used to designate equally well a duct for transporting fluid or a container for storing fluid and also an accessory, such as a valve, fitted to such a duct or container.

STATE OF THE ART

In particular for sodium transport ducts, it is important to be able to monitor for the appearance of a leak, both automatically and remotely.

For this purpose, patents FR-A-2 155 534 and FR-A-2 455 707 propose devices for detecting a leak of sodium through the wall of a duct by detecting electrical contact between the wall of the duct and an electrically conductive element spaced apart from the wall by an insulating element.

The device described in FR-A-2 455 707 comprises a rigid and insulating shell made of a material comprising fibers embedded in a binder. The shell has grooves receiving metal tapes or wires and holding the tapes or wires spaced apart from the wall of the duct.

A drawback of that device stems from the difficulty of making a shell, or a half-shell, that is a good fit to the outside surface of the duct for which it is intended, in particular when said outside surface is complex in shape.

The device described in FR-A-2 155 534 comprises an insulating sheet made of refractory fibers suitable for winding around a metal duct, and a metal fabric or grid wound around the insulating sheet and in tight contact with the insulating sheet.

A drawback of that device results from the difficulty in shaping the fabric or grid so that it fits closely to the insulating sheet without some portion of the fabric or grid penetrating into the insulating sheet and thereby involuntarily establishing contact between the fabric or grid and the wall of the duct, which is generally made of metal.

Furthermore, fabrics, grids, tapes, or wires made of metal run the risk of oxidizing. Under such circumstances, the formation of a film of oxide on the surface of such a metal conductive element can impede or slow down the detection of a short circuit between said element and the wall of the duct, and can consequently impede or slow down the detection of a leak.

Furthermore, such conductive metal elements may deform by thermal expansion during variations in the temperature of the duct, and that also can lead to a malfunction of the leak detector system.

SUMMARY OF THE INVENTION

An object of the invention is to provide a device for detecting a leak of a fluid flowing in a duct or stored in a container, a device for covering the duct or container and incorporating the detector device, a member for transporting or storing fluid and fitted with such a covering, a method of covering a member for transporting or storing fluid, and a method of checking proper operation of such a leak detector device, which are improved and/or which remedy, at least in part, the shortcomings or drawbacks of prior methods and devices.

An object of the invention is to propose a device for detecting a leak of liquid sodium under pressure at a temperature that may lie in a range going from about 100° C. (degree Celsius) to about 600° C., a device for covering a duct and including the detector device, a member for transporting or storing said fluid and fitted with such a covering, a method of covering a member for transporting or storing said fluid, and also a method of checking proper operation of such a leak detector device.

In an aspect of the invention, there is provided a device for detecting a leak of a fluid stored or transported in an electrically conductive duct, which device is arranged to surround, or envelop, the duct. The detector device comprises a layer of an insulating fibrous material and a layer of a conductive fibrous (or filamentary) material that extends over/against the layer of insulating fibrous material, the conductive fibrous material being constituted essentially by a carbon or graphite felt.

In particular because of its cohesion, the conductive material serves to avoid untimely short circuits between said material and the electrically conductive duct, while also facilitating making short circuits deliberately as described below for the purpose of checking proper operation of the leak detector device. In an embodiment, the insulating material is a mineral fiber wool, in particular a wool of woven or twisted fibers constituted essentially of silica and magnesium or calcium oxide.

The conductive fibrous material may comprise one or more layers of flexible felt, essentially constituted by agglomerated carbon or graphite fibers.

By monitoring the impedance as measured between the layer of conductive fibrous material and the wall of the duct, it is possible to detect the presence of a conductive fluid that has passed through the layer of insulating fibrous material in the event of the fluid leaking through the wall of the duct.

Such a conductive fibrous material is relatively insensitive to oxidation and its ability to conduct electricity is little affected by potential oxidation thereof.

Furthermore, the flexibility of this material enables it to adapt to deformations of the equipment/members that it surrounds, in particular the deformations resulting from thermal expansion of the equipment.

The flexibility of this conductive material makes it easier to install on a duct that has already been covered in the insulating material, and makes it possible to avoid contact being made accidentally between the conductive fibrous material and the wall of the duct while the conductive material is being put into intimate contact with and pressed against the layer of insulating material.

Furthermore, the conductive fibrous material contributes to providing the duct with thermal insulation, thereby serving to limit losses of heat from the fluid flowing in or stored in the duct, and serving to protect operators against the risk of being burnt.

The detector device may comprise first ties, in particular filamentary ties or ties in the form of cords, that are used for securing the layer of insulating material to a duct, e.g. by being strapped around it.

The detector device may include second ties, in particular filamentary ties or ties in the form of cords, that are used for securing the layer of conductive fibrous material to the duct covered in the insulating material, e.g. by being strapped around it.

The first and second ties may be constituted essentially by fibers of an electrically insulating material, which may be identical or similar to the material constituting the insulating covering layer.

Such ties enable the outside wall of a duct of complex shape to be covered in simple manner by cutting a tie to a suitable length and surrounding the layer in question by the tie shaped to form a loop or ring, and then closing the loop by knotting the two free ends of the tie together, or by using an appropriate device for connecting the ends together, such as a cable clamp.

The detector device generally includes a first connection member, or terminal, that is arranged to facilitate making an electrical connection between the electrically conductive layer and an electrical or electronic detector device such as an impedance meter.

The connection member may comprise a contact element in the form of a rod or a bar that may be inserted or buried at least in part in the conductive fibrous layer. Under such circumstances, in particular, the contact element may be made at least in part of graphite or of carbon, and it may present a shape and dimensions that are adapted to the thickness of the agglomerated filamentary structure of the conductive layer.

Alternatively, the connection member may comprise a contact element in the form of a clamp having jaws suitable for clamping against a portion of the conductive fibrous layer.

In addition to the appliance for detecting a short circuit or measuring impedance, a detector device generally also includes a second connection member, or terminal, that is in contact with the wall of the duct.

According to another aspect of the invention, there is provided a device for covering a duct, which device comprises:

an electrically insulating first layer essentially made up of fibers and extending against the outside surface of the duct;

an electrically conductive second layer essentially constituted by agglomerated carbon or graphite fibers and extending against the outside surface of the first layer; and a thermally insulating third layer essentially constituted by fibers that extend against the outside surface of the second layer.

The covering device may also include a rigid wall arranged to surround or envelop the thermally insulating third layer.

The rigid wall may comprise two portions, or half-shells, and connection means for assembling the two portions together.

The rigid wall may be pierced by at least one orifice suitable for passing a tool for checking proper operation of the leak detector device through said wall and the layers of the covering of the duct.

According to another aspect of the invention, there is provided a duct for transporting or a container for storing a heat-transfer fluid forming part of a reactor, which duct or container is fitted with such a device for detecting a leak of the heat-transfer fluid, or is covered in such a covering device.

According to another aspect of the invention, there is provided a method of checking proper operation of a leak detector device fitted to a duct and including a layer of insulating fibrous material covered in a layer of conductive fibrous material, wherein a short circuit is established between the wall of the duct and the layer of conductive fibrous material.

In a preferred implementation of the method, an electrically conductive tool is inserted for this purpose through the layer of conductive material and through the layer of insulating material, and the tool is put into contact with the (conductive) wall of the duct while keeping said tool in contact with the layer of conductive material through which the tool extends, in order to establish the short circuit and check that the leak detector system is operating properly by making use of impedance measurement to measure the impedance between the wall of the duct and the layer of conductive material.

The electrically conductive tool may be made of metal, and in particular it may be in the form of a rod or a needle.

Other aspects, characteristics, and advantages of the invention appear from the following description that refers to the accompanying figures showing preferred embodiments of the invention without any limiting character.

DETAILED DESCRIPTION OF THE INVENTION

Unless stated explicitly or implicitly to the contrary, elements or members that are structurally or functionally identical or similar are given identical references in the various figures.

With reference to FIGS. 1 to 5, a duct 10 for transporting liquid sodium under pressure has a cylindrical wall 11 extending along a longitudinal axis 12. The wall 11 may be made of stainless steel.

Figure 1:
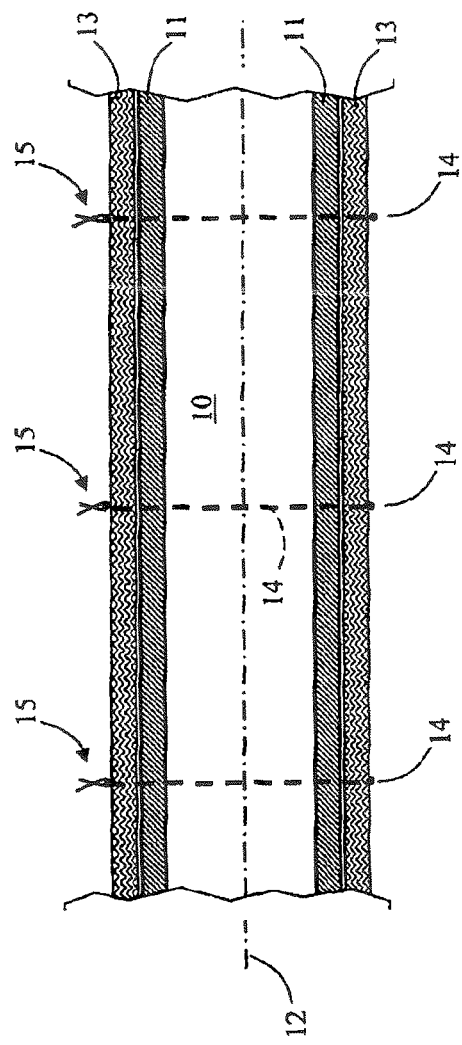
FIG. 1 is a diagrammatic longitudinal section view of a duct covered in a layer of insulating fibrous material.

With reference to FIG. 1 in particular, a layer of insulating fibrous material 13 has been wound, or laid in some other way, around the wall 11 and is held in contact with the outside face of that wall by cords 14 surrounding the layer of material 13 and knotted (references 15) in order to form closed loops surrounding the layer 13.

By way of example, the material 13 may be a mineral fiber wall sold under the name "Superwool 607 Blanket" by the supplier Thermal Ceramics (USA).

This layer of mineral wool may present thickness of about 2 millimeters, and up to about 5, 10, or millimeters, for example.

It is generally desirable for the thickness of this layer of material 13 to be less than 20 millimeters so as to limit the time taken by fluid escaping from the duct to impregnate and/or pass through this layer of material and reach the layer of conductive material, and thus limit the time that elapses before it is possible to detect a leak.

Other insulating fibrous materials may be used for making the layer 13, and in particular wools having fibers of silica and magnesium or calcium oxide.

Figure 2:
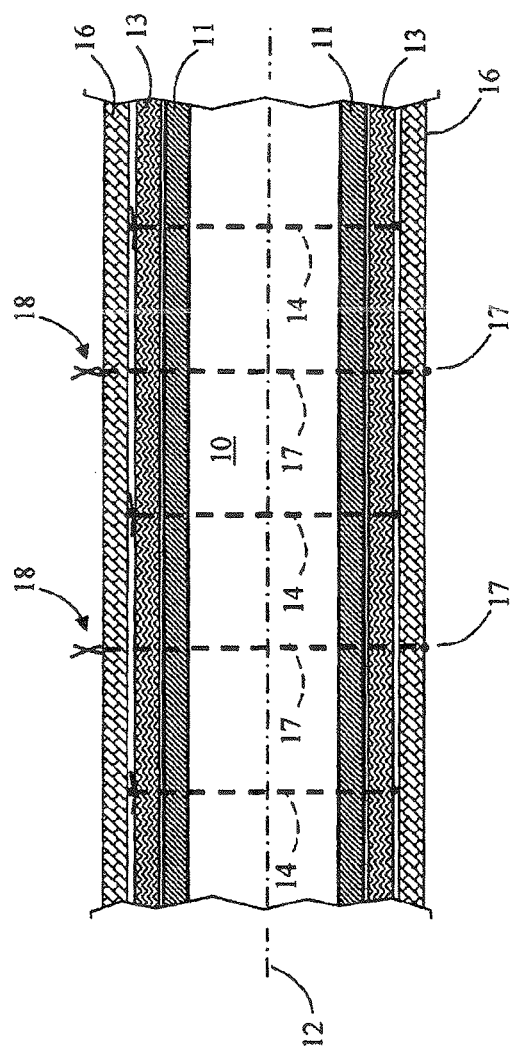
FIG. 2 is a diagrammatic longitudinal section view of the duct covered in the FIG. 1 insulating layer and covered in a layer of conductive fibrous material.

With reference to FIG. 2 in particular, a layer of conductive material 16 has been wound, or otherwise laid, around the layer of insulating fibrous material 13 and is held in contact with the outside face of the layer of material 13 by cords 17 surrounding the layer of material 16 and knotted (references 18) in order to form closed loops.

The conductive material 16 may for example be a graphite felt sold under the name "Sigratherm® GFA" by the supplier SGL Carbon GmbH (Germany). Such a graphite felt may be obtained by graphitizing a carbon felt.

The thickness of this layer of felt may be of the order of about 5 millimeters, and may lie in the range about 5 millimeters to at least about 10 millimeters, e.g. up to about 20 millimeters, about 30 millimeters, or about 50 millimeters.

It is generally desirable for the thickness of this layer of material 16 to be greater than or equal to 5 millimeters in order to increase the thermal insulation it provides, to facilitate its electrical connection with an impedance measurement appliance, and to facilitate checking the detector device is operating properly, as described below.

Other conductive fibrous materials may be used for making the layer 16, in particular carbon fiber felts.

The ties 14 and 17 may for example be essentially constituted by filaments of silica.

The thickness and the flexibility of each of the two layers of fibrous materials 13 and 16, and also the flexibility of the ties holding these materials in place, enable ducts or containers of a wide variety of shapes to be covered closely, thereby ensuring that it is possible to cover all of the zones of a cooling circuit that contains a fluid for which a leak needs to be detected quickly and reliably.

Figure 3:
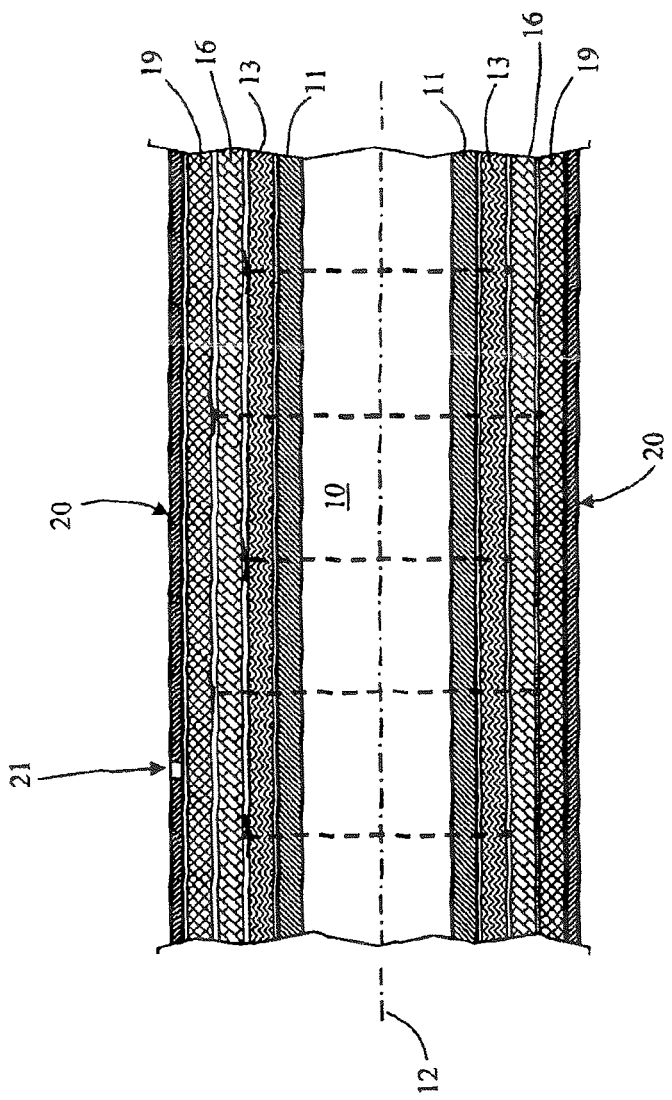
FIG. 3 is a diagrammatic longitudinal section view of the duct fitted with a FIG. 2 detector device, and also covered in a layer of insulating material surrounded by a rigid wall.

With reference to FIG. 3 in particular, a layer 19 of thermally insulating material has been laid around the layer of conductive fibrous material 16 and is held in contact with the outside face of the layer of material 16 by a tubular wall 20 extending around the longitudinal axis 12 and surrounding the layer of material 19.

By way of example, the thermally insulating material 19 may be constituted essentially by glass or rock wool. The thickness of the layer of material 19 is generally greater than that of the layers of material 13 and 16. By way of example, this thickness may be of the order of about 20 to 50 (or 100) millimeters.

The rigid wall or shell 20 serves in particular to provide mechanical protection to the layers of fibrous material 13, 16, and 19 that it surrounds.

The wall 20 is pierced by an orifice 21 for passing a tool (reference 22 in FIGS. 4 and 5) for checking proper operation of the leak detector device through said wall and the layers 13, 16, and 19 of the covering of the duct 10.

Figure 4:
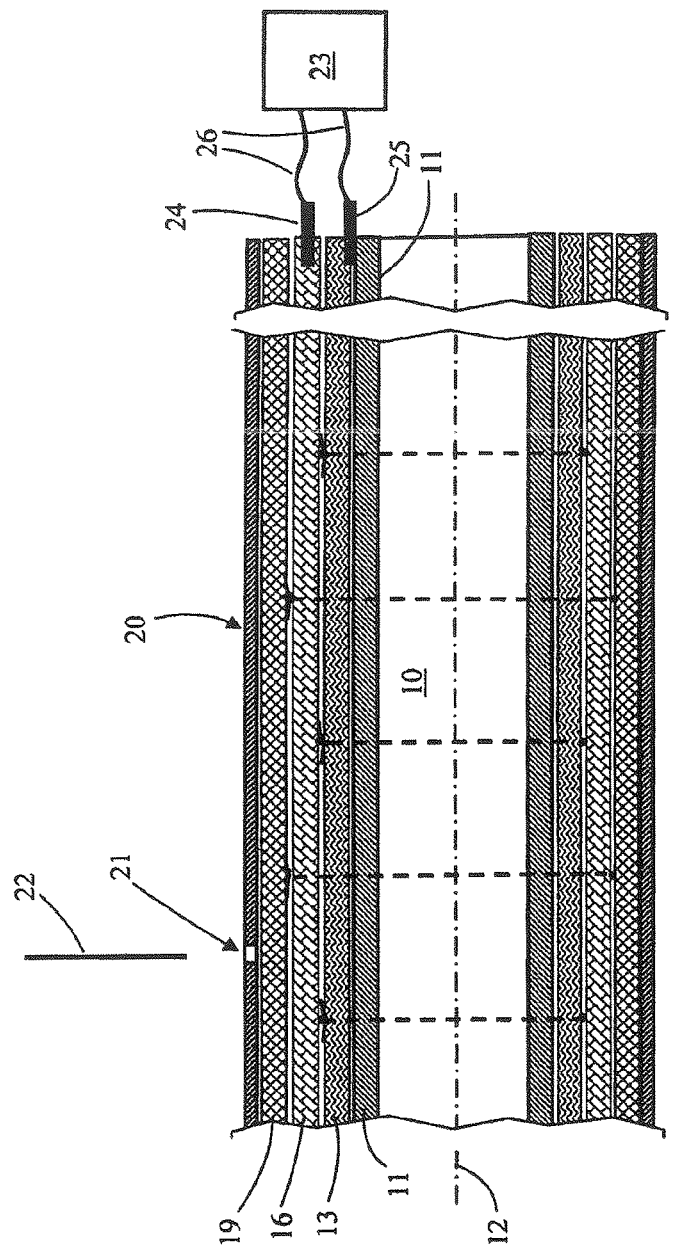
FIG. 4 is a diagrammatic longitudinal section view showing how a leak through the wall of the duct shown in FIG. 3 is detected.

With reference to FIG. 4 in particular, monitoring impedance as measured between the layer of conductive fibrous material 16 and the wall 11 of the duct 10 serves to detect the presence of a conductive fluid that has passed through, and impregnated, the layer of insulating fibrous material 13, in the event of the fluid leaking through the wall 11 of the duct.

For this purpose, the leak detector device comprises:
  an appliance 23 for detecting a short circuit by measuring impedance;
  a member 24 for electrically connecting the electrical conductive layer 16 to the appliance 23;
  a member 25 for electrically connecting the wall 11 of the duct to the appliance 23; and
  two segments of conductor wire 26 respectively connecting the contact/connection members 24 and 25 to the measurement terminals of the appliance 23.

In general, the appliance 23 comprises: i) an impedance measuring circuit arranged to deliver a measurement signal; ii) a comparator circuit connected to the impedance measuring circuit for receiving the measurement signal and arranged to compare the received signal with a determined signal or data, and to deliver a comparison signal; and iii) an alarm control circuit connected to the comparator circuit to receive the comparison signal therefrom and arranged to cause an alarm to operate as a function of the received comparison signal.

Figure 5:
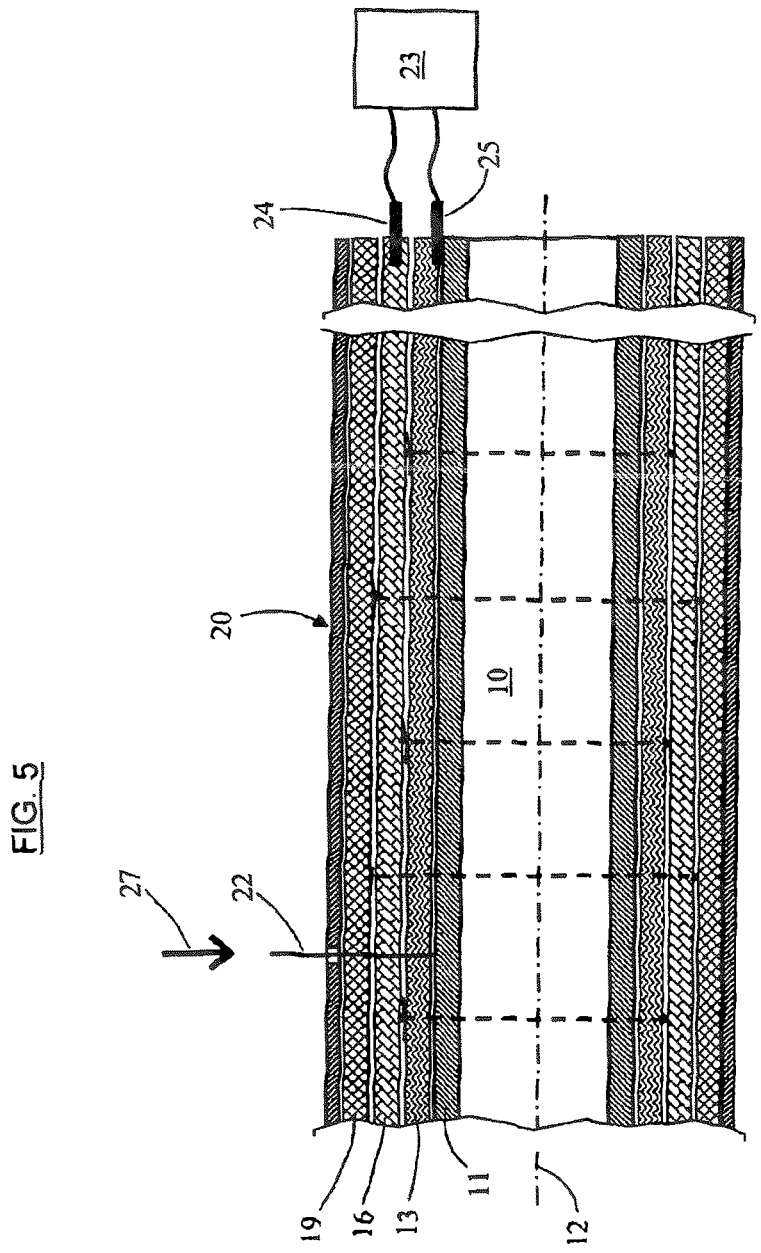
FIG. 5 is a diagrammatic longitudinal section view showing the leak detector system of FIG. 4 being checked for proper operation.

The connection member 24 shown in FIGS. 4 and 5 is in the form of a rod or bar of graphite or carbon and it is inserted in the thickness of the conductive filamentary layer 16.

The second connection member 25, which is in electrical contact with the wall of the duct, may be a metal part welded to the duct.

In order to check that the leak detector device fitted to the duct 10 is operating properly, a short circuit is established between the wall 11 of the duct and the layer 16 of conductive fibrous material.

With reference to FIGS. 4 and 5, a metal needle 22 is inserted (along arrow 27 in FIG. 5) for this purpose through the orifice 21 provided in the wall 20 and through the superposed layers of thermally insulating material 19, of conductive material 16, and of insulating material 13, so as to put the longitudinal (bottom) end of the conductive needle 22 into contact with the wall 11 of the duct.

Since the length of the needle is greater than the total thickness of the layers of insulating and conductive material 13 and 16, the needle remains held in electrical contact with the layer of conductive material 16 through which it passes.

The needle 22 thus establishes a short circuit between the wall 11 and the layer of material 16, thus making it possible, by using the appliance 23 to measure impedance, to check whether the leak detector system is operating properly: the impedance measuring appliance 23 must indicate the presence of a short circuit so long as the needle 22 is kept in contact with the wall 11 and with the layer of material 16.

It should be observed that this operation of checking proper operation can be performed at any moment that is felt to be appropriate throughout the lifetime of the installation, and that this operation does not lead to any damage of the covering of the duct, in particular because of the fibrous structure of the layers making up the covering.

The invention claimed is:
1. A device for detecting a leak of a fluid that is stored or transported in a duct (10) having an electrically conductive outer wall (11), which duct is covered in a layer of insulating fibrous material (13) arranged to surround the duct, the device comprising:

a layer of conductive fibrous material (16) that extends against the layer of insulating fibrous material (13), the conductive fibrous material being constituted by a carbon or graphite felt;

a detector appliance (23) for detecting a short circuit or measuring impedence between the outer wall (11) of the duct and the layer of conductive fibrous material (16);

a contact element (24) inserted or buried, at least in part, in the conductive fibrous material 916) in order to connect electrically the layer of conductive fibrous material (16) to the detector appliance (23); and a layer of thermally insulating material (19) essentially constituted by fibers that extends against and surrounds the layer of conductive fibrous material (16).

2. A device according to claim 1, wherein the insulating fibrous material (13) comprises silica fibers.

3. A device according to claim 1, wherein the contact element (24) is made, at least in part, out of graphite or carbon.

4. A device according to claim 1, wherein the contact element is in the form of a clamp having jaws capable of clamping onto a portion of the conductive fibrous material (16).

5. A device according to claim 1, wherein the thickness of the layer of conductive fibrous material (16) is greater than or equal to about 5 millimeters.

6. A device according to claim 1, wherein the thickness of the layer of conductive fibrous material (16) lies in a range from about 5 millimeters to about 10, 20, 30, or 50 millimeters.

7. A device according to claim 1, wherein the thickness of the layer of insulating fibrous material (13) is less than 20 millimeters.

8. A device according to claim 1, wherein the thickness of the layer of thermally insulating material (19) is greater than or equal to about 10 millimeters.

9. A device according to claim 1, further including a rigid wall (20) arranged to surround or envelop the layer of thermally insulating material.

10. A device according to claim 9, wherein the rigid wall is pierced by at least one orifice (21) suitable for passing a tool (22) for checking proper operation of the leak detector device through said wall and the layers of the covering of the duct.

11. A duct (10) for transporting or storing a heat-transfer fluid, the duct having an electrically conductive outer wall (11) and being covered in a layer of insulating fibrous material (13) arranged to surround the duct, the duct being fitted with a device for detecting a leak of the heat-transfer fluid, the device comprising:

a layer of conductive fibrous material (16) that extends against the layer of insulating fibrous material (13), the conductive fibrous material being constituted by a carbon or graphite felt;

a detector appliance (23) for detecting a short circuit or measuring impedence between the outer wall (11) of the duct and the layer of conductive fibrous material (16);

a contact element (24) inserted or buried, at least in part, in the conductive fibrous material 916) in order to connect electrically the layer of conductive fibrous material (16) to the detector appliance (23); and a layer of thermally insulating material (19) essentially constituted by fibers that extends against and surrounds the layer of conductive fibrous material (16)

the duct having first ties (14) serving to secure the layer of insulating fibrous material (13) to the wall (11) of the duct.

12. A duct according to claim 11 and having second ties (17) serving to secure the layer of conductive fibrous material (16) to the duct covered in the insulating fibrous material (13).

13. A duct according to claim 11, wherein the first ties are filamentary ties or in the form of cords and essentially constituted by fibers of electrically insulating material.

14. A method of covering a duct (10) for transporting or storing a heat-transfer fluid in a device that is for detecting a leak of the heat-transfer fluid, the duct having an electrically conductive outer wall (11) and being covered in a layer of insulating fibrous material (13) arranged to surround the duct, the device comprising:

a layer of conductive fibrous material (16) that extends against the layer of insulating fibrous material (13), the conductive fibrous material being essentially constituted by a carbon or graphite felt;

a detector appliance (23) for detecting a short circuit or measuring impedence between the outer wall (11) of the duct and the layer of conductive fibrous material (16);

a contact element (24) inserted or buried, at least in part, in the conductive fibrous material 916) in order to connect electrically the layer of conductive fibrous material (16) to the detector appliance (23); and a layer of thermally insulating material (19) essentially constituted by fibers that extends against and surrounds the layer of conductive fibrous material (16);

wherein the layer of insulating fibrous material (13) is secured to the outer wall (11) of the duct by strapping first ties (24) around said layer.

15. A method according to claim 14, wherein the layer of conductive fibrous material (16) is secured to the duct covered in the insulating fibrous material (13) by strapping second ties (17) around the layer of conductive fibrous material (16).

16. A method according to claim 14, the method being performed on a duct for transporting sodium under pressure or on a container for storing sodium under pressure.

17. A method of checking proper operation of a leak detector device fitted to a duct—the duct having an electrically conductive outer wall (11) and being coated in a layer of insulating fibrous material (13) arranged to surround the duct, the leak detector device comprising a layer of conductive fibrous material (16) that extends against the layer of insulating fibrous material (13), the conductive fibrous material being essentially constituted by a carbon or graphite felt, wherein a short circuit is established between the wall (11) of the duct and the layer of conductive fibrous material (16).

18. A method according to claim 17, wherein an electrically conductive tool (22) is inserted through the layer of conductive fibrous material (16) and through the layer of insulating fibrous material (13), and the tool (22) is put into contact with the conductive wall (11) of the duct while keeping said tool in contact with the layer of conductive fibrous material through which the tool (22) extends, in order to establish the short circuit and check that the leak detector system is operating properly by measuring the impedance between the wall of the duct and the layer of conductive fibrous material.

19. A method according to claim 18, wherein the electrically conductive tool (22) is made of metal, in the form of a rod or a needle.

20. A method according to claim 17, the method being performed on a duct for transporting sodium under pressure or on a container for storing sodium under pressure.

* * * * *